May 3, 1932. V. B. SEASE 1,857,089
REVERSING PHOTOGRAPHIC NEGATIVES
Filed Oct. 8, 1931
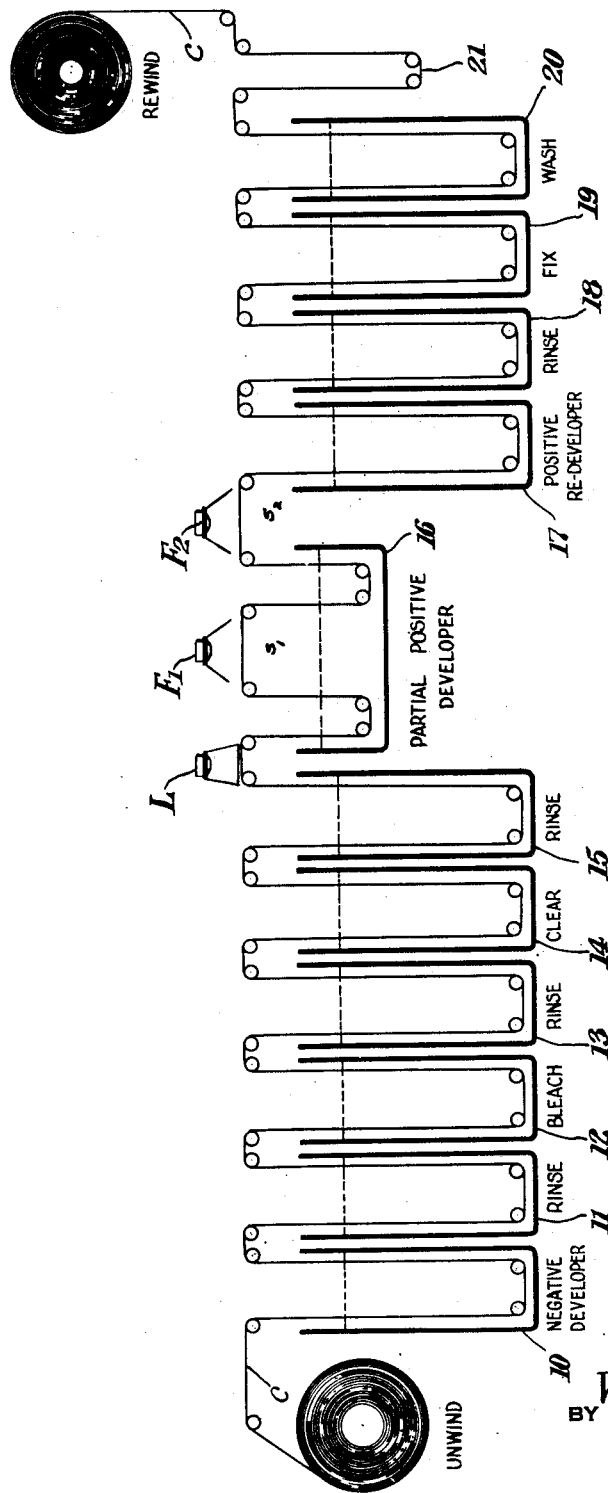
INVENTOR
Virgil B. Sease
BY
ATTORNEY Patented May 3, 1932

1,857,089

UNITED STATES PATENT OFFICE

VIRGIL B. SEASE, OF PARLIN, NEW JERSEY, ASSIGNOR TO DU PONT FILM MANUFACTURING CORPORATION, OF NEW YORK, N. Y., A CORPORATION OF DELAWARE

REVERSING PHOTOGRAPHIC NEGATIVES

Application filed October 8, 1931. Serial No. 567,627.

This invention relates to a cinematic reversal process and is more particularly directed to such a process especially applicable to the quantity production of amateur cinema film reversals on a commercial basis.

The amateur usually exposes on each roll of film a variety of different scenes at different times under different conditions, and many of such scenes are often improperly exposed. It is therefore apparent that reversal processes embodying automatic apparatus or other methods or means that determine only an average result for an entire roll of varying scenes can only produce therefrom a reversed print in which some or many of the scenes necessarily receive unsatisfactory treatment.

One of the disadvantages of reversal systems that include a photo-electric cell arises in the reversal of scenes in which a relatively small object, such as a subject's face, is photographed against a contrasting background. In this case the photo-electric cell controls the exposure on the basis of the total amount of light passing through the negative of such a scene and therefore cannot time such a negative on the proper basis of the particular point of interest therein.

Other reversal processes suggest the use of a test strip taken from one end of each reel that is put through the system. It is apparent that this test strip will give no reliable or adequate information for the subsequent proper treatment of the various remaining scenes appearing in the reel. There is inherent in these processes the inescapable likelihood of spoiling many of such scenes that require an entirely different treatment than that indicated by such a test strip.

One of the objects of this invention is to provide a reversal process for producing an improved positive from a roll of cinema film containing differently exposed negative scenes. Another object is to provide such a process that will, in an efficient and inexpensive manner produce a positive print in each of the negative scenes in a roll of inexpertly exposed cinema film that will be properly intensified in relation to the particular point of interest in that scene. Other and more specific objects will more plainly appear from the detailed description of the invention subsequently set forth herein.

To enable those skilled in the art to use my invention, I will as an illustration describe a preferred embodiment thereof with the understanding that modifications may be made without departing from its spirit and scope in its broader aspects.

In the drawing the figure is a diagrammatic representation of a preferred arrangement of an apparatus for carrying out my novel reversal method. This apparatus consists of a series of solution tanks respectively designated by the reference characters 10 to 20 inclusive, through which the cinema film C is led at a preferred rate of approximately twenty feet per minute from an unwinding reel over the usual rollers into a drying chamber 21 and finally to a rewinding mechanism. The apparatus also includes a definite underexposure light source diagrammatically shown at L. This light may be provided with suitable adjusting means and is equipped with a shade or some other means to confine its rays to the film area as shown.

F1 and F2 represent increment light sources, preferably flash lights operated by the attendant. A single portable flash light may be used by the operator at the points F1 and F2, or separate flash lights may be removeably and/or adjustably positioned at these points. These lights preferably have a quick operating switch to readily turn them on and off, and are also provided with means to confine their rays to the restricted areas as shown in the figure. These light sources as well as the light source L may each preferably comprise a suitable incandescent electric lamp. Bright safe lights are placed preferably at s1 and s2 to permit the visual inspection of the film from above at F1 and F2.

The outer end of a roll of camera-exposed but undeveloped silver halide commercial negative cinema film, which may comprise one or more suitably spliced lengths of film, is attached to the usual suitable leader which is fixed to the unwinding mechanism which carries the film through the apparatus in accordance with my improved method in the following preferable course:

I. Tank 10 is designed to permit the undeveloped negative cinema film C to receive during its passage therethrough a vigorous negative developer bath of approximately 12 minutes duration in order to fully bring out the negative image. This and subsequent baths are preferably at 68° F. A preferred formula for the bath in tank 10 is:

| | |
|---|---|
| Sodium sulphite | 56.7 grams |
| Hydroquinone | 4.9 grams |
| Sodium carbonate | 45.3 grams |
| Metol | 1.3 grams |
| Potassium bromide | 1.5 grams |
| Water to make | 1 liter |

II. The film next passes through a suitable rinsing bath in tank 11 preferably containing circulating water.

III. Tank 12 is designed to permit the film C to receive during its passage therethrough a suitable bleach bath of approximately five minutes duration. A preferred formula for this bath is as follows:

| | |
|---|---|
| Potassium dichromate | 6 grams |
| Conc. sulphuric acid | 10 cc. |
| Water to make | 1 liter |

The purpose of this bath is to remove the silver from the negative image developed in step 1 thus leaving on the film the silver halide not affected by the original exposure in the camera. This in effect removes the negative image and leaves what may be termed a relief image sculptured in the silver halide layer. The emulsion at this step contains what may be referred to as a latent positive image.

IV. The film next passes through a second rinsing bath in tank 13.

V. Tank 14 is designed so as to permit the film C to receive during its passage therethrough a clearing bath of approximately five minutes duration. A preferred formula for this bath is as follows:

| | |
|---|---|
| Sodium sulphite | 23 grams |
| Water to make | 1 liter |

The purpose of this bath is to remove any undesirable products or stains that may be formed in the silver halide during the bleaching bath.

VI. The film next passes through a third rinsing bath in tank 15.

VII. As the film leaves the rinsing bath in tank 15 it travels beneath the definite under-exposure light source L at the previously mentioned approximate speed of twenty feet per minute. It is important that this exposure be limited to approximately sixty candlemeter seconds which will at this point assure a deliberate and definite under-exposure to commercial cinema film. The purpose of this step is to guard against any possibility of subsequently over-exposing any scenes that were originally badly exposed in the camera.

VIII. Tank 16 is designed so as to permit the film C to receive during its passage therethrough a partial positive developer bath of approximately one minute in duration. A preferred formula for this bath is as follows:

| | |
|---|---|
| Potassium ferrocyanide | 3.7 grams |
| Metol | .25 grams |
| Sodium sulphite | 15.6 grams |
| Hydroquinone | 2.4 grams |
| Potassium bromide | 2.4 grams |
| Potassium carbonate | 21.1 grams |
| Sodium nitrite | .5 grams |
| Water to make | 1 liter |

The purpose of this bath is to partially develop the latent partial positive image previously under-exposed in the preceding step.

IX. The film next emerges from tank 16 at F1 and passes over the safe light s1 whose light is transmitted through the film C to enable the operator to observe the scene as it passes before him. At this point the operator flashes each scene with an additional amount of light that the visual inspection of the scene indicates is desirable to bring up its intensity.

X. The film then re-enters tank 16 and re-emerges at F2 where it passes over the safe light s2. At this point the operator again observes each of the scenes as it passes before him and again flashes each scene with a final increment of light that each scene then indicates desirable for its intensification. It should be noted here that there is a possibility that some scenes may appear at F2 that need no further intensification whatsoever. In other words, such scenes have been properly exposed and intensified at F1 and obviously require no added increment of light at F2. The steps just described enable the operator to give each scene the intensification it requires thereby properly compensating not only for the original exposure of each scene in the camera, but also for the central point of interest in each scene.

XI. Tank 17 is designed so as to permit the cinema film C to receive during its passage therethrough a positive redeveloper bath of approximately seven minutes in duration.

The formula of the solution in tank 17 is preferably the same as that used in tank 16.

XII. The film next passes through a fourth rinsing bath in tank 18.

XIII. Tank 19 is designed so as to permit the film C to receive during its passage therethrough a fixing bath of approximately five minutes in duration. A preferred formula for this bath is as follows:

| | |
|---|---|
| Hypo | 200 grams |
| Sodium sulphite | 10 grams |
| Glacial acetic acid | 10 cc. |
| Chrome alum | 20 grams |
| Water to make | 1 liter |

The process up to this point is carried on in a suitable safe light.

XIV. From this point on the process may be conducted in white light. The film is next thoroughly washed in tank 20.

XV. From the washing bath the film is led through a suitable drying chamber 21 and is subsequently rewound, ready for projection as a positive.

The particularly important features of my invention just described in steps VII to XI inclusive reveal that my novel reversal method includes the deliberate and definite under-exposure of the latent positive image of each of a variety of scenes in a cinema film, followed by the addition thereto of the light increments that each scene visually indicates necessary for its desired intensification. The present invention thereby provides an improved cinematic reversal process that produces an improved positive print in each negative scene, properly intensified in relation to the original exposure and to the cental point of interest therein.

Having herein described a preferred embodiment of my invention, it is expressly stated that it is illustrative only and not limited to the materials and specific elements set forth, but comprises all the equivalents of the several cooperating features herein shown and described. Hence I desire to cover all modifications within the language or scope of any one or more of the appended claims.

What I claim as new and desire to secure by Letters Patent is:

1. In a reversal process for producing a positive cinematic image in a roll of undeveloped silver halide cinema film containing a latent negative image of differently exposed cinematic scenes; the steps of vigorously developing said negative image and subsequently chemically removing the silver therefrom; flashing said roll with only enough light to deliberately under-expose the therein remaining latent positive image so as to permit a partial positive image to be developed therefrom; developing said partial positive image and separately flashing each of said scenes with the additional amount of light that the partial positive image of each of said scenes visibly indicates as necessary for the desired intensification thereof, and then subsequently submitting said roll to final developing and finishing operations.

2. In a reversal process for producing a positive cinematic image in a roll of undeveloped silver halide commercial cinema film containing a latent negative image of differently exposed cinematic scenes; the steps, conducted in a safe light, of vigorously developing said negative image and subsequently chemically removing the silver therefrom; then passing each of said scenes through only enough incandescent light to deliberately and definitely under-expose the therein remaining latent positive image so as to permit a partial positive image to be developed therefrom; partially developing said partial positive image and separately flashing each of said scenes with the additional increments of incandescent light that the partial positive image of each of said scenes visibly indicates as necessary for the desired intensification thereof, and then subsequently submitting said roll to final developing and finishing operations.

3. In a reversal process for producing a positive cinematic image in a roll of undeveloped silver halide commercial cinema film containing a latent negative image of differently exposed cinematic scenes; the steps, conducted in a safe light, of vigorously developing said negative image and subsequently chemically removing the silver therefrom; then giving each of said scenes an exposure of approximately 60 candlemeter seconds from an incandescent light to deliberately and definitely under-expose the therein remaining latent positive image so as to permit a partial positive image to be developed therefrom; partially developing said partial positive image and separately flashing each of said scenes with the additional increments of incandescent light that the partial positive image of each of said scenes visibly indicates as necessary for the desired intensification thereof, and then subsequently submitting said roll to final developing and finishing operations.

In testimony whereof, I have signed my name to this specification this 24th day of September, 1931.

VIRGIL B. SEASE.